(12) United States Patent
Maan (10) Patent No.: US 11,233,579 B1
(45) Date of Patent: Jan. 25, 2022

(54) CURRENT INJECTION BASED GENERATION OF INDISTINGUISHABLE GLAUBER-STATE AND DECOY-STATE OPTICAL SIGNALS

(71) Applicant: Robert Bosch GmbH, Stuttgart (DE)

(72) Inventor: Pranshu Maan, Northville, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/119,747

(22) Filed: Dec. 11, 2020

(51) Int. Cl.
| H04B 10/00 | (2013.01) |
| H04B 10/70 | (2013.01) |
| G06N 10/00 | (2019.01) |
| H04L 9/08 | (2006.01) |
| H04B 10/11 | (2013.01) |
| G02F 1/35 | (2006.01) |
| H04J 14/00 | (2006.01) |

(52) U.S. Cl.
CPC ........... *H04B 10/70* (2013.01); *G02F 1/3515* (2013.01); *G06N 10/00* (2019.01); *H04B 10/11* (2013.01); *H04L 9/0858* (2013.01)

(58) Field of Classification Search
CPC .................................................... H04B 10/70
See application file for complete search history.

(56) References Cited

U.S. PATENT DOCUMENTS

| 7,847,234 B2 | 12/2010 | Meyers et al. |
| 9,696,133 B2 | 7/2017 | Yuan et al. |
| 9,819,418 B2 | 11/2017 | Nordholt et al. |
| 10,158,481 B2 | 12/2018 | Bunandar et al. |
| 10,225,081 B2 | 3/2019 | Wabnig et al. |
| 2004/0032888 A1 | 2/2004 | Ferstl |
| 2006/0222180 A1 | 10/2006 | Elliott |
| 2015/0236791 A1 | 8/2015 | Nordholt et al. |

(Continued)

OTHER PUBLICATIONS

Williams, "Signal Sources, Conditioners and Power Circuitry", Linear Technology Application Note 98, Nov. 2004, pp. AN98-1-AN98-27.

(Continued)

*Primary Examiner* — Daniel G Dobson
(74) *Attorney, Agent, or Firm* — Michael Best & Friedrich LLP (57) ABSTRACT

Systems and methods for generating indistinguishable Glauber-state and decoy-state optical signals. In one implementation, the system includes a direct current ("DC") current source, a configurable pulse generator, an electronic controller, and a laser diode. The electronic controller is configured to control the DC current source to apply a bias signal to a node. The electronic controller is further configured to control the configurable pulse generator to apply Glauber-state excitation current pulses to the node to generate Glauber-state current injection pulses. The electronic controller is also configured to control the configurable pulse generator to apply decoy-state excitation current pulses to the node to generate decoy-state current injection pulses. An amplitude of the decoy-state current injection pulses is less than an amplitude of the Glauber-state current injection pulses. The laser diode is configured to generate Glauber-state and decoy-state optical signals based on the Glauber-state and decoy-state current injection pulses.

20 Claims, 9 Drawing Sheets

(56) References Cited

U.S. PATENT DOCUMENTS

| | | | | |
|---|---|---|---|---|
| 2015/0304051 A1* | 10/2015 | Yuan | .................. | H04B 10/70 398/188 |
| 2016/0047643 A1* | 2/2016 | Yuan | .................. | H01S 5/4006 398/25 |
| 2020/0059358 A1 | 2/2020 | Legre et al. | | |

OTHER PUBLICATIONS

Huang et al., "Quantum key distribution with distinguishable decoy states", Physical Review A, vol. 98, 2018, 13 pages.

Thompson et al., "High Power Laser Diode Driver Based on Power Converter Technology", IEEE Transactions on Power Electronics, vol. 12, No. 1, Jan. 1997, pp. 46-52.

AeroDiode, "High speed laser diode driver with user-design nanosecond pulse shape", <https://www.aerodiode.com/product/high-speed-laser-diode-driver/?v=7516fd43adaa>, website publicly available at least as early as Sep. 2020, 8 pages.

Laser Diode Control, High POwer 70 Amp Short Pulse Lase Diode Drive, 12 Nanosecond Pulses <https://www.laserdiodecontrol.com/shop/Pulsed-Laser-Diode-Drivers-15-nanosecond-pulses-Trimatiz>, website publicly available at least as early as May 2016, 4 pages.

Texas Instruments, "TI Designs: TIDA-01573 Nanosecond Laser Drive Reference Design for LiDAR", Product Information, <https://www.ti.com/lit/ug/tidue52/tidue52.pdf?ts=1597418321184&ref_url=https%253A%252F%252Fwww.google.com%252F>, Feb. 2018, 21 pages.

PicoLAS, "LDP-V 10-70 Mini Drive for Short Pulse Laser Diodes", Data Sheet, <https://picolas.de/wp-content/uploads/2019/10/LDP-V_10-70_Datasheet_Rev1905.pdf>, website publicly available at least as early as Sep. 2020, 1 page.

PicoLAS, "LDP-AV 4N20-40 LIDAR Sequential controlled Laser Diode Driver", Data Sheet, <https://picolas.de/wp-content/uploads/2020/04/LDP-AV_4N20-40_datasheet_Rev2004_mbr_jhs_asz.pdf>, website publicly available at leasl as early as Sep. 2020, 1 page.

Digi-Key, "MAX3869 Maxim Integrated Laser Drivers", Product offerings, <https://www.digikey.com/en/products/base-product/maxim-integrated/175/MAX3869/18777>, website publicly available at least as early as Sep. 2020, 1 page.

\* cited by examiner

CURRENT INJECTION BASED GENERATION OF INDISTINGUISHABLE GLAUBER-STATE AND DECOY-STATE OPTICAL SIGNALS

FIELD

The present disclosure relates generally to Quantum Key Distribution. More specifically, the present disclosure relates to generating indistinguishable Glauber-state and decoy-state optical signals for quantum communication using modulated current injection of a laser diode.

BACKGROUND

Quantum communication relies on laws of physics to provide provably secure communication. In this, two parties exchange secret keys by means of quantum states, to encode or decode any information. These are usually implemented using diagonal basis and conjugate anti-diagonal basis or using circular basis states of photons. A third party can eavesdrop on the quantum communication between the two parties. Thus, to keep the quantum communication private, the information is encoded in Glauber-state optical signals that are sent along with decoy-state optical signals. Aside from a slight variation in intensity, Glauber-state and decoy-state optical signals are intentionally indistinguishable from each other. Third party eavesdropping can be detected using an error rate in the system. Further, a secret key can be distilled, and amount of information an eavesdropper has can be minimized using privacy amplification.

SUMMARY

Inherent characteristics of a laser diode used for generating optical signals introduce signal artifacts which can be used to distinguish between Glauber-state and decoy-state optical signals. Indistinguishable Glauber-state and decoy-state optical pulses can be generated by applying perturbations on a constant current node so as to generate current injection pulses with a constant current offset. The constant current offset suppresses the signal artifacts introduced by inherent characteristics of the laser diode. In some implementations, all emissions due to the constant current offset are suppressed using a constant optical attenuator and the only emissions present are due to pulsed current injection.

The present disclosure provides a system for generating indistinguishable Glauber-state and decoy-state optical signals. In one implementation, the system includes a direct current ("DC") current source, a configurable pulse generator, an electronic controller, and a laser diode. The DC current source, the configurable pulse generator, and the laser diode are coupled to a node. The electronic controller is coupled to the DC current source and the configurable pulse generator. The electronic controller is configured to control the DC current source to apply a DC bias signal to the node. The electronic controller is further configured to control the configurable pulse generator to apply Glauber-state excitation current pulses to the node to generate Glauber-state current injection pulses. The electronic controller is also configured to control the configurable pulse generator to apply decoy-state excitation current pulses to the node to generate decoy-state current injection pulses. An amplitude of the decoy-state current injection pulses is less than an amplitude of the Glauber-state current injection pulses. The laser diode is configured to generate Glauber-state optical signals based on the Glauber-state current injection pulses. The laser diode is further configured to generate decoy-state optical signals based on the decoy-state current injection pulses.

The present disclosure also provides a method for generating indistinguishable Glauber-state and decoy-state optical signals. The method includes applying, with a DC current source, a DC bias signal to a node. The method also includes applying, with a configurable pulse generator, Glauber-state excitation current pulses to the node to generate Glauber-state current injection pulses. The method further includes generating, with a laser diode coupled to the node, Glauber-state optical signals based on the Glauber-state current injection pulses. The method also includes applying, with the configurable pulse generator, decoy-state excitation current pulses to the node to generate decoy-state current injection pulses. An amplitude of the decoy-state current injection pulses is less than an amplitude of the Glauber-state current injection pulses. The method further includes generating, with the laser diode, decoy-state optical signals based on the decoy-state current injection pulses.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate implementations, and explain various principles and advantages of those implementations.

The system and method components have been represented where appropriate by conventional symbols in the drawings, showing only those specific details that are pertinent to understanding the implementations so as not to obscure the disclosure with details that will be readily apparent to those of ordinary skill in the art having the benefit of the description herein.

DETAILED DESCRIPTION

Figure 1:
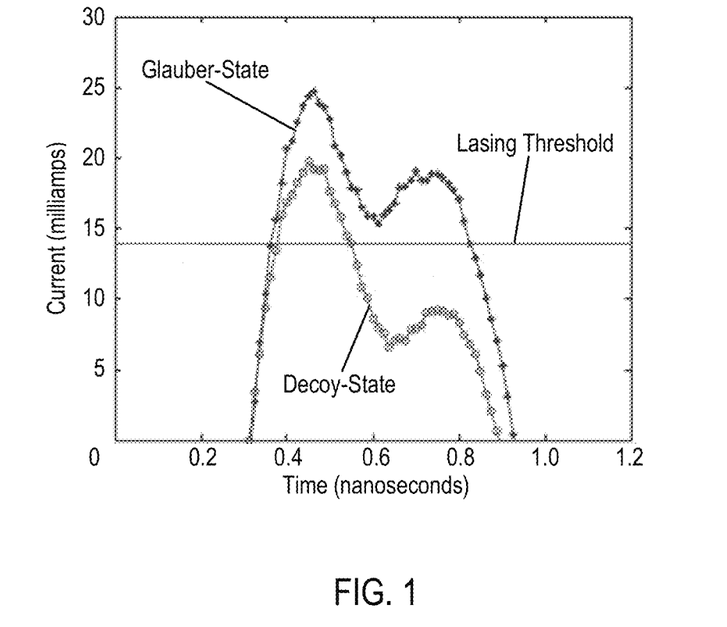
FIG. 1 is a graph of an example of a laser-diode's pump current during Glauber-state and decoy-state generation.

Quantum key distribution can be accomplished using a combination of Glauber-state and decoy-state optical signal generation. An inexpensive technique for implementing this is by modulating injection current fed into a laser diode. Decoy-state optical signals can be generated by simply reducing the modulated injection current level and having a constant attenuator at the output of the laser diode to generate single photon. However, this technique, although cheaper, results in distinguishable Glauber-state and decoy-state optical signals, jeopardizing security of the quantum communication. In laser diodes, injection current oscillation sets in when excited from the off-level. This oscillation occurs due to sudden change in injected carrier density into the laser diode. So, decoy-state optical signals, which are generated by reducing intensity of the modulated excitation, can be distinguished by identifying the oscillation pattern. FIG. 1 is a graph of an example of a laser-diode's pump current during Glauber-state and decoy-state generation. As illustrated in FIG. 1, the two current pulses start from the off-state. The lasing threshold is the lowest excitation level at which a laser diode's output is dominated by stimulated emission rather than by spontaneous emission. Due to inherent characteristics of laser diodes, emissions resulting from a driver that start from the off-state result in severe oscillations which produce distinguishable Glauber-state and decoy-state optical signals. For example, the large differences between the start of the current pulses and their peak values result in oscillations as illustrated in FIG. 1. The Glauber-state current pulse includes two peaks above the lasing threshold whereas the decoy-state current pulse includes only a single peak above the lasing threshold. The difference in detectable peaks renders the decoy-state signal distinguishable from the Glauber-state signal.

Figure 2:
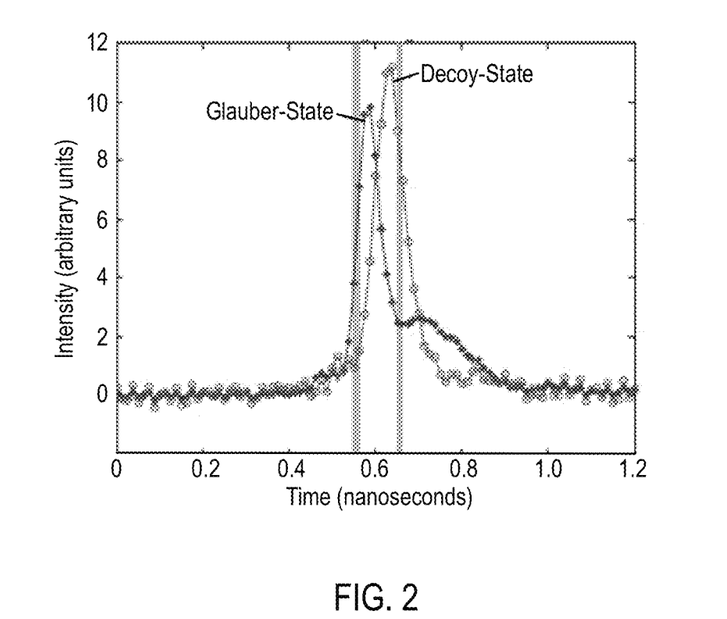
FIG. 2 is a graph of an example of intensities for Glauber-state and decoy-state signals generated by pump-current modulation of a laser diode.

Moreover, when driving a laser diode by suddenly turning it on, injection current dependent delay in the output signal is observed. So, the delay is observed between Glauber-state and decoy-state output signals, which makes them distinguishable, creating security loophole. FIG. 2 is a graph of an example of intensities for Glauber-state and decoy-state signals generated by pump-current modulation of a laser diode. As illustrated in FIG. 2, the Glauber-state signal and the decoy-state signal do not totally overlap. The decoy-state signal lags behind the Glauber-state signal due to its lower amplitude, and thus is distinguishable.

The systems and methods disclosed herein overcome the above-described two drawbacks in the time domain. Consequently, improvement can be observed in the spectrum of signals too. Indistinguishable Glauber-state and decoy-state optical pulses are generated by applying perturbations, which is, for example, a configurable digital modulation on a constant current node so as to generate modulated current injection pulses with a constant current offset. The constant current offset suppresses the oscillation in injection current. Also, tunability of configurable radio-frequency ("RF") source results in adjusting the delay so as to minimize the mismatch between the signal and decoy state pulse produced by same laser diode. At the output, constant attenuation can be used to suppress any optical signal due to constant current offset, and emissions present are due to modulated current injection.

Figure 3:
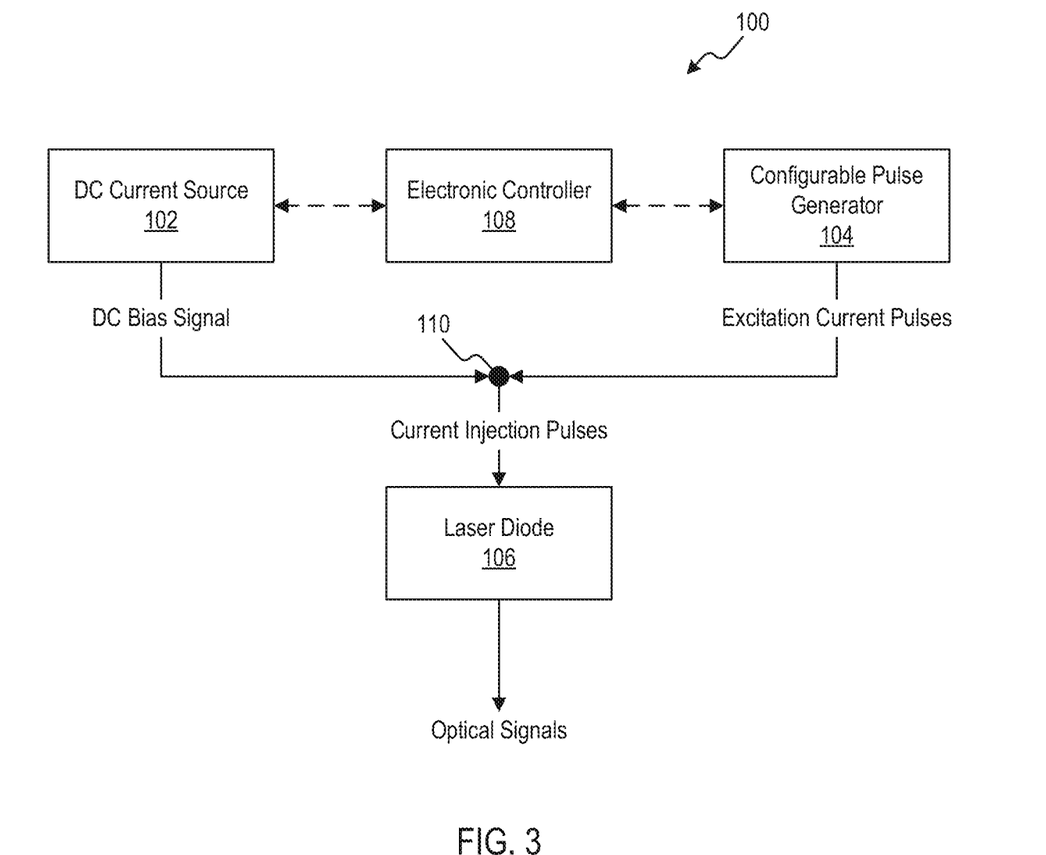
FIG. 3 is a block diagram of an example of a system for generating indistinguishable Glauber-state and decoy-state optical signals, in accordance with some implementations.

FIG. 3 is a block diagram of an example of a system 100 for generating indistinguishable Glauber-state and decoy-state optical signals. The system 100 illustrated in FIG. 3 includes a direct current ("DC") current source 102, a configurable pulse generator 104, a laser diode 106, and an electronic controller 108. In some implementations, the system 100 includes fewer or additional components in configurations different from the one illustrated in FIG. 3. For example, in practice, the system 100 may include additional components such as power supplies, capacitors, resistors, inductors, and the like. For ease of explanation, these additional components are not illustrated here. In some implementations, all of the components of the systems are housed on a single printed circuit board ("PCB").

The DC current source 102, the configurable pulse generator 104, and the laser diode 106 are all coupled to a common node (i.e., node 110). The DC current source 102 is configured to apply a DC bias signal to the node 110. The configurable pulse generator 104 is configured to apply excitation current pulses to the node 110. The DC bias signal and the excitation current pulses combine at the node 110 to form current injection pulses for driving the laser diode 106 to produce optical signals. The current injection pulses are modulated. The electronic controller 108 is coupled to the DC current source 102 and to the configurable pulse generator 104. The electronic controller 108 controls the DC current source 102 and the configurable pulse generator 104 to generate matched Glauber-state and decoy-state current injection pulses. The amplitude of the decoy-state current injection pulses is lower than the amplitude of the Glauber-state current injection pulses. Thus, the amplitude of resulting decoy-state optical signals is lower than the amplitude of Glauber-state optical signals.

In some implementations, the electronic controller 108 controls the configurable pulse generator 104 to apply excitation current pulses with a first amplitude to the node 110 to generate Glauber-state current injection pulses. Further, the electronic controller 108 controls the configurable pulse generator 104 to apply excitation current pulses with a second amplitude (lower than the first amplitude) to the node 110 to generate decoy-state current injection pulses. The excitation current pulses with the first amplitude are one example of "Glauber-state excitation pulses" and the excitation current pulses with the second amplitude are one example of "decoy-state excitation pulses." The excitation current pulses are modulated.

In other implementations, the electronic controller 108 controls the DC current source 102 to apply a DC bias signal with a first current to the node 110 to generate Glauber-state current injection pulses. Further, the electronic controller 108 controls the DC current source 102 to apply a DC bias signal with a second current (lower than the first current) to the node 110 to generate decoy-state current injection pulses. The DC bias signal with the first current is one example of a "Glauber-state DC bias signal" and the DC bias signal with the second current is one example of a "decoy-state DC bias signal."

Figure 4:
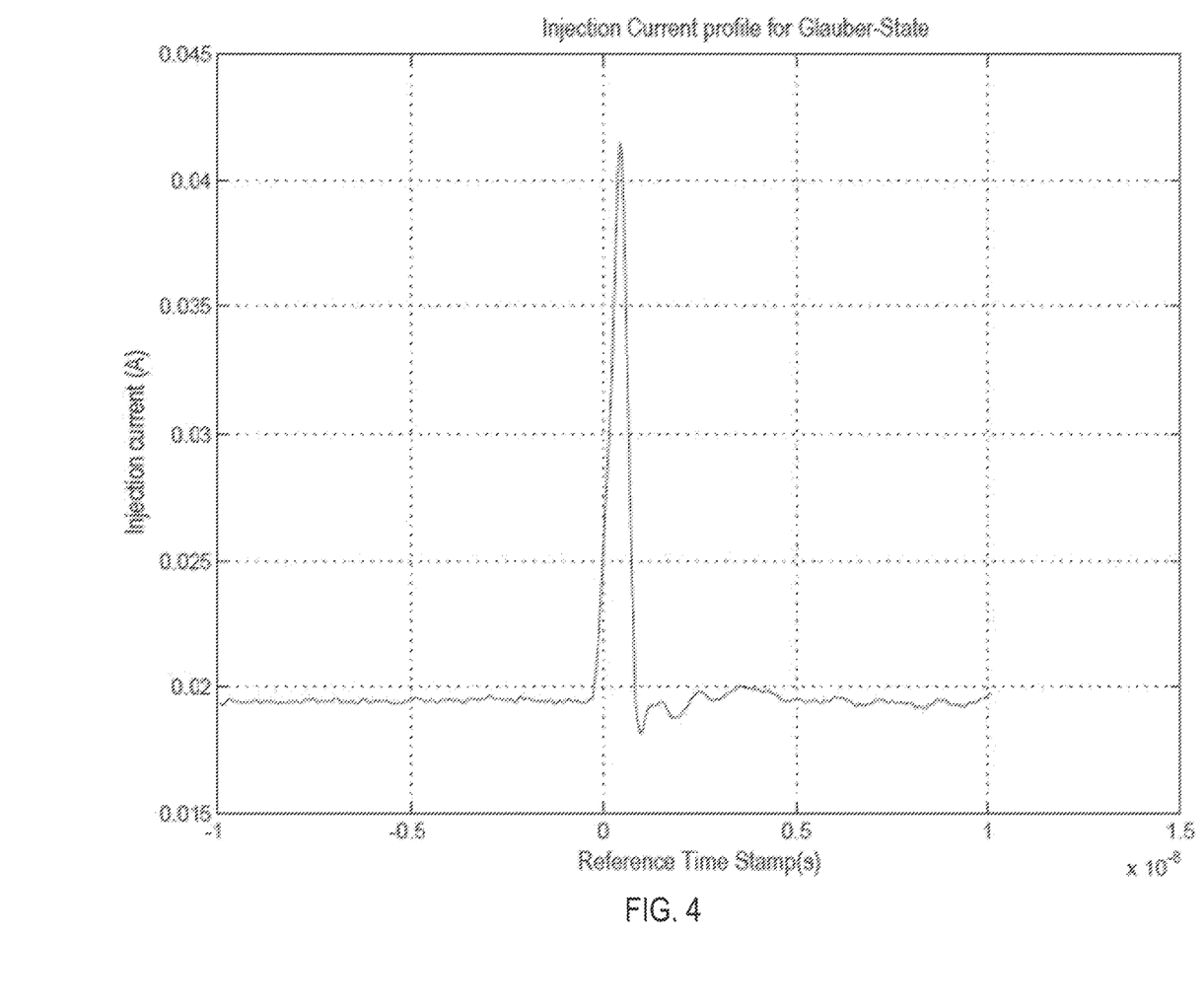
FIG. 4 is a graph of an example of a Glauber-state current injection pulse generated by the system of FIG. 3.
Figure 5:
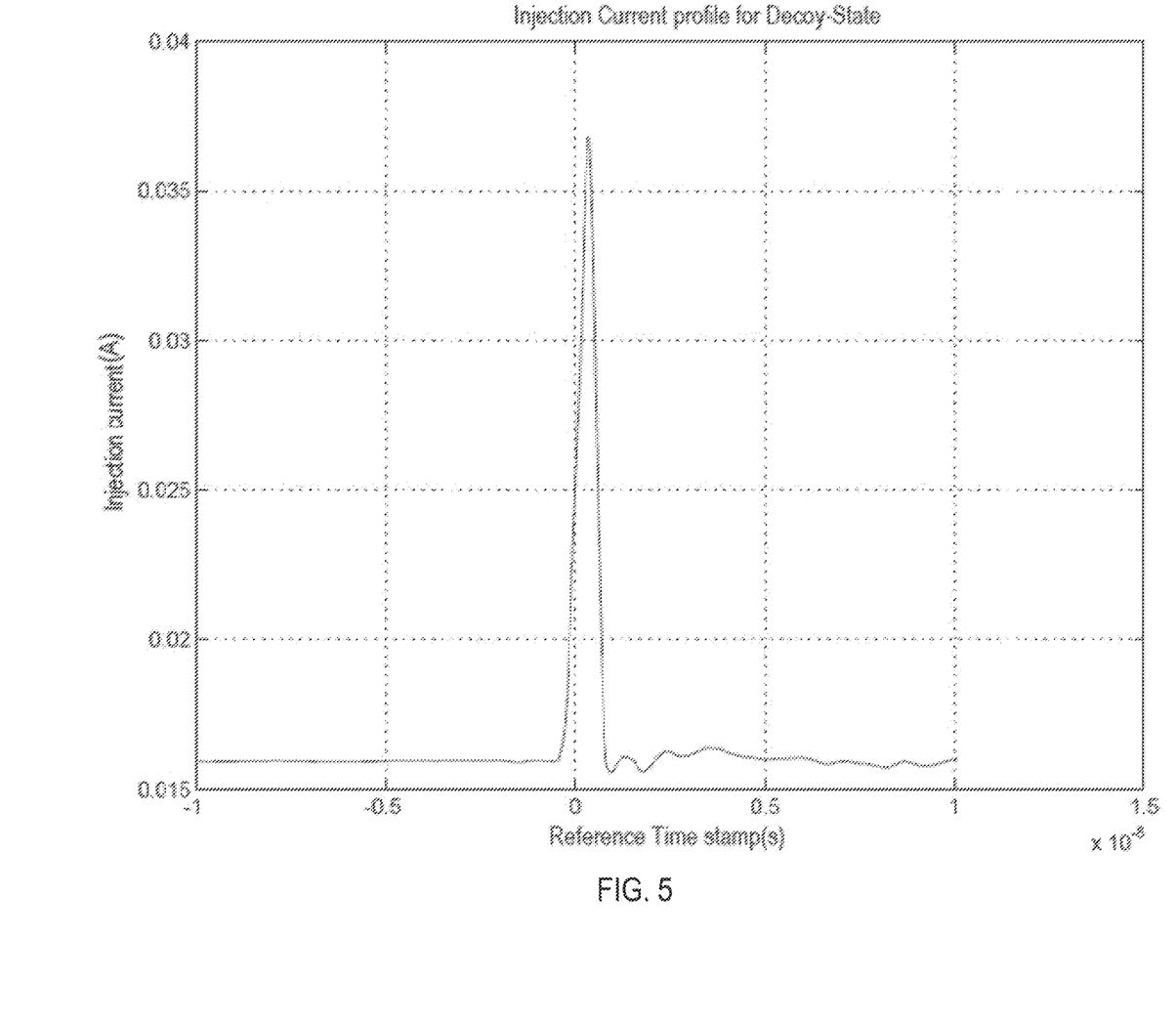
FIG. 5 is a graph of an example of a decoy-state current injection pulse generated by the system of FIG. 3.

The DC current source 102 constantly applies the DC bias signal to the node 110 to provide a constant current offset. The constant current offset raises the floor of the current injection pulses, and thus reduces their amplitude (i.e., reduces the difference between the starting and peak values of the current injection pulses). The reduction in amplitude caused by the DC bias signal suppresses (or essentially eliminates) the oscillations described above in relation to FIG. 1. For example, FIGS. 4 and 5, respectively, are graphs of examples of Glauber-state and decoy-state current injection pulses that include a constant current offset caused by the DC bias signal. As illustrated in FIGS. 4 and 5, the Glauber-state and decoy-state current injection pulses both include a single peak, and thus the resulting optical signals will only include one peak, making them more indistinguishable from each other. In some implementations, the electronic controller 108 is configured to control the DC current source 102 to set a current of the DC bias signal to be greater than a threshold current of the laser diode 106

(i.e., greater than the lasing threshold). For example, when the lasing threshold of the laser diode 106 is 18 milliamps, the electronic controller 108 may control the DC current source 102 to set the current of the DC bias signal to be slightly greater than 18 milliamps. In other implementations, the electronic controller 108 is configured to control the DC current source 102 to set a current of the DC bias signal to be near the threshold current of the laser diode 106.

As described above in relation to FIG. 2, decoy-state signals can lag behind Glauber-state signals due to their lower amplitude. Thus, in some implementations, the electronic controller 108 is configured to control the configurable pulse generator 104 to start applying the decoy-state excitation current pulses to the node 110 earlier than the Glauber-state excitation current pulses. For example, the configurable pulse generator 104 may set the time delay between applying a decoy-state excitation current pulse after a Glauber-state excitation current pulse to be shorter than the time delay between applying a Glauber-state excitation current pulse after a decoy-state excitation current pulse.

As described above, the configurable pulse generator 104 applies excitation current pulses to the node 110. In some implementations, the configurable pulse generator 104 is configured to apply excitation current pulses to the node 110 by suppling current to the node 110. For example, in some implementations, the configurable pulse generator 104 is coupled to the node 110 via a line driver or a push-pull configuration. In other implementations, the configurable pulse generator 104 is configured to apply excitation current pulses to the node 110 by drawing current from the node 110. For example, in some implementations, the configurable pulse generator 104 is coupled to the node 110 via an open collector configuration or a push-pull configuration.

Figure 6:
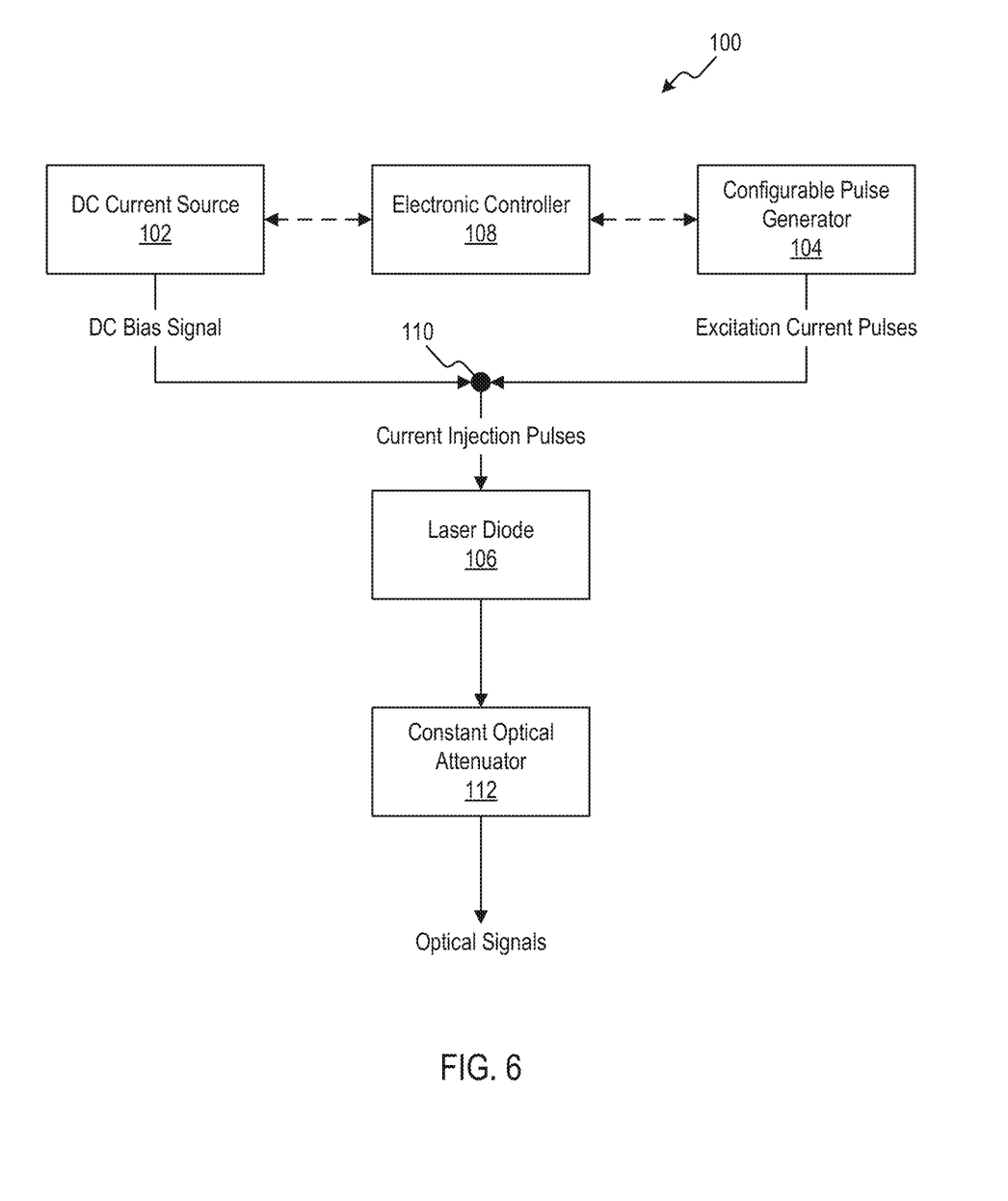
FIG. 6 is a block diagram of an example of a system for generating indistinguishable Glauber-state and decoy-state optical signals that includes a constant optical attenuator, in accordance with some implementations.

In some implementations, the system 100 further includes a constant optical attenuator 112 as illustrated in FIG. 6. The constant optical attenuator 112 is coupled to the laser diode 106. In some implementations, the constant optical attenuator 112 is coupled directly to the output of the laser diode 106. In other implementations, a polarization modulator (not shown) is coupled between the output of the laser diode 106 and the constant optical attenuator 112. The constant optical attenuator 112 is configured to suppress emissions caused by the DC bias signal. For example, the constant optical attenuator 112 may be configured to attenuate all optical signals with intensity levels that are less than or equal to the intensity level of optical signals generated by the laser diode 106 when only the DC bias signal is applied to the node 110. In this manner, the only photons emitted by the system 100 are the ones caused by pulsed current injection. Suppressing emissions caused by the DC bias signal can enhance the indistinguishability between the Glauber-state and decoy-state optical signals generated by the system 100. For example, in implementations in which the DC current source 102 applies different DC bias signals to generate Glauber-state and decoy-state current injection pulses, there may be a detectable variance between the minimum values of the Glauber-state and decoy-state optical signals generated by the laser diode 106. By suppressing emissions caused by the DC bias signal, the constant optical attenuator 112 removes the variance between the minimum values of the Glauber-state and decoy-state optical signals generated by the laser diode 106.

Figure 7:
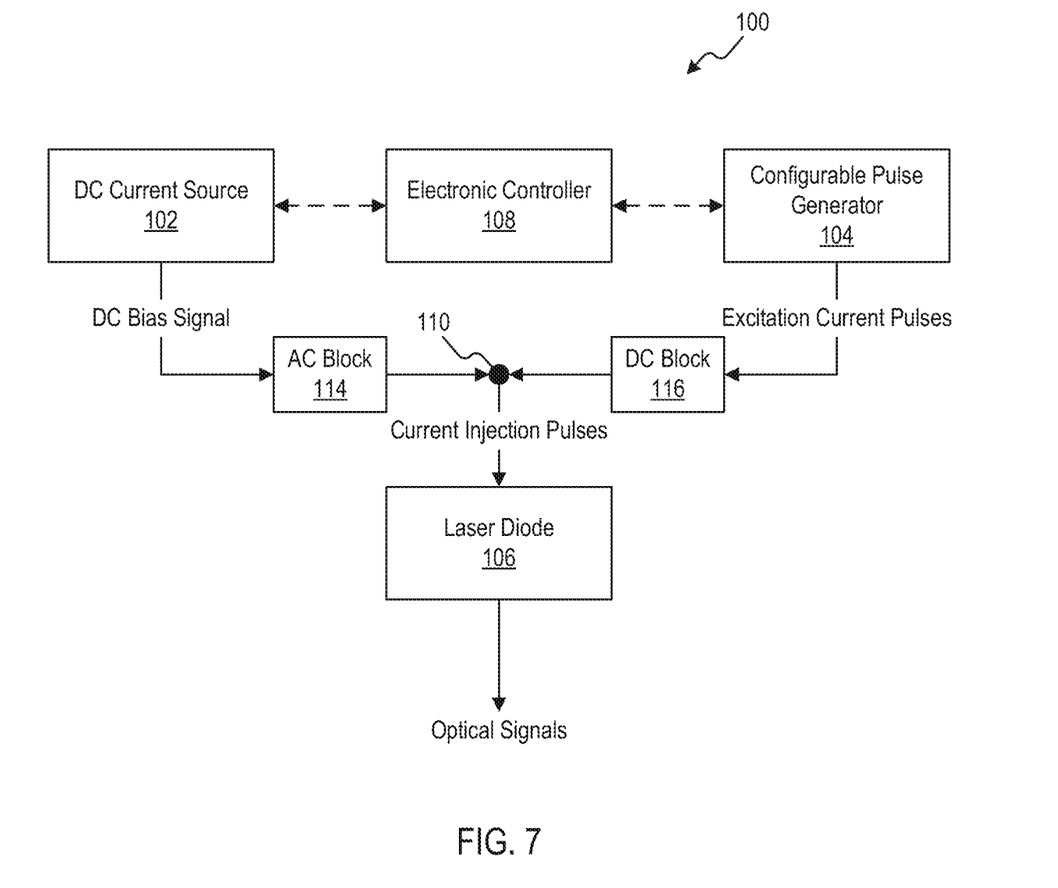
FIG. 7 is a block diagram of an example of a system for generating indistinguishable Glauber-state and decoy-state optical signals that includes signal filtering blocks, in accordance with some implementations.

Because the DC current source 102 and the configurable pulse generator 104 are both coupled to the node 110, alternating current ("AC") signals (or RF current signals) generated by the configurable pulse generator 104 (e.g., the excitation current pulses) may interfere with the operation of the DC current source 102. Further, for the same reason, DC signals generated by the DC current source 102 (e.g., the DC bias signal) may interfere with the operation of the configurable pulse generator 104. Thus, in some implementations, the system 100 further includes an AC block 114 and a DC block 116 as illustrated in FIG. 7. The AC block 114 is positioned between the DC current source 102 and the node 110. The AC block 114 includes one or more components to filter (i.e., block) AC signals generated by the configurable pulse generator 104. For example, the AC block 114 may include one or more inductors or diodes. The DC block 116 is positioned between the configurable pulse generator 104 and the node 110. The DC block 116 includes one or more components to filter (i.e., block) DC signals generated by the DC current source 102 or output current limiting resistor. For example, the DC block 116 may include one or more capacitors or resistors.

Figure 8:
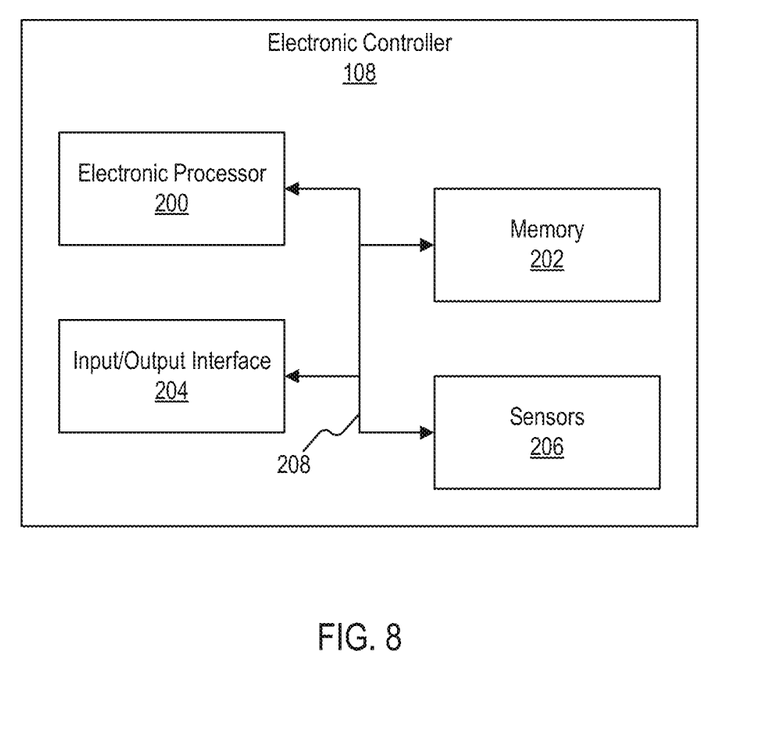
FIG. 8 is a block diagram of an example of an electronic controller included in the system of FIG. 3, in accordance with some implementations.

FIG. 8 is a block diagram of an example of the electronic controller 108. The electronic controller 108 illustrated in FIG. 8 includes an electronic processor 200 (for example, one or more microprocessors, application-specific integrated circuits ["ASICs"], systems-on-a-chip ["SoCs"], and the like), a memory 202, an input/output interface 204, sensors 206, and a bus 208. In some implementations, the electronic controller 108 includes fewer or additional components in configurations different from the one illustrated in FIG. 8. The components included in the electronic controller 108 are coupled to each other via the bus 208. The memory 202 includes, for example, read-only memory ("ROM"), random access memory ("RAM"), an electrically erasable programmable read-only memory ("EEPROM"), other non-transitory computer-readable media, or a combination thereof. In some implementations, the memory 202 is included in the electronic processor 200. The electronic processor 200 is configured to retrieve computer-readable instructions and data from the memory 202 and execute the computer-readable instructions to perform the functionality and methods described herein. The input/output interface 204 includes routines for transferring data between components within the electronic controller 108 and components external to the electronic controller 108. The input/output interface 204 is configured to transmit and receive data via one or more wired couplings (for example, wires, optical fiber, and the like), wirelessly, or a combination thereof. For example, the input/output interface 204 may be connected via wired connections to the DC current source 102 and the configurable pulse generator 104 to send control signals thereto. The sensors 206 are configured to detect and measure, for example, electrical characteristics of one or more components or at one or more connection points of the system 100. For example, in some implementations, the sensors 206 include a current sensor to measure the current applied to the laser diode 106. As a further example, in some implementations, the sensors 206 include a temperature sensor to measure a temperature of the laser diode 106.

The configurable pulse generator 104 is able to produce excitation current pulses of varying delays, frequency, widths, amplitudes, and edge skews. For example, the configurable pulse generator 104 may be configured to generate sub-nanosecond excitation current pulses that result in sub-nanosecond current injection pulses for driving the laser diode 106. The parameters of the excitation current pulses produced by the configurable pulse generator 104 are controlled, for example, based on control signals received from the electronic controller 108. For example, the electronic controller 108 may control the configurable pulse generator 104 to set the width and amplitudes of excitation current pulses based on the operating parameters of a quantum communication scheme in which the system 100 is being employed.

Alternatively, or in addition, the electronic controller 108 may control the configurable pulse generator 104 based on feedback. For example, the electronic controller 108 may determine a difference between the Glauber-state and decoy-state current injection pulses by measuring current flowing through the laser diode 106 (e.g., using one or more of the sensors 206 included in the electronic controller 108). The electronic controller 108 may reduce the difference between the Glauber-state and decoy-state current injection pulses by controlling the configurable pulse generator 104 to adjust at least one attribute of the Glauber-state excitation current pulses, the decoy-state excitation current pulses, or both. For example, the electronic controller 108 may control the configurable pulse generator 104 to adjust the widths, the amplitudes, or a time delay between the Glauber-state and decoy-state excitation current pulses. Alternatively, or in addition, the electronic controller 108 may reduce the difference between the Glauber-state and the decoy-state current injection pulses by controlling the DC current source 102 to adjust an attribute of the DC bias signal. For example, the electronic controller 108 may control to DC current source 102 to adjust the current of the DC bias signal.

The temperature of the laser diode 106 can affect properties of the optical signals which the laser diode 106 generates. Thus, in some implementations, the electronic controller 108 is configured to measure a temperature of the laser diode 106 (e.g., using one or more of the sensors 206 included in the electronic controller 108). The electronic controller 108 adjusts, based on the temperature of the laser diode 106, at least one attribute of the DC bias signal, the Glauber-state excitation current pulses, the decoy-state excitation current pulses, or a combination thereof. As a first example, the electronic controller 108 may control the DC current source 102 to decrease the current of the DC bias signal when the temperature of the laser diode 106 is greater than a threshold temperature value. As a second example, the electronic controller 108 may control the configurable pulse generator 104 to reduce the amplitudes of the Glauber-state and decoy-state excitation current pulses.

Figure 9:
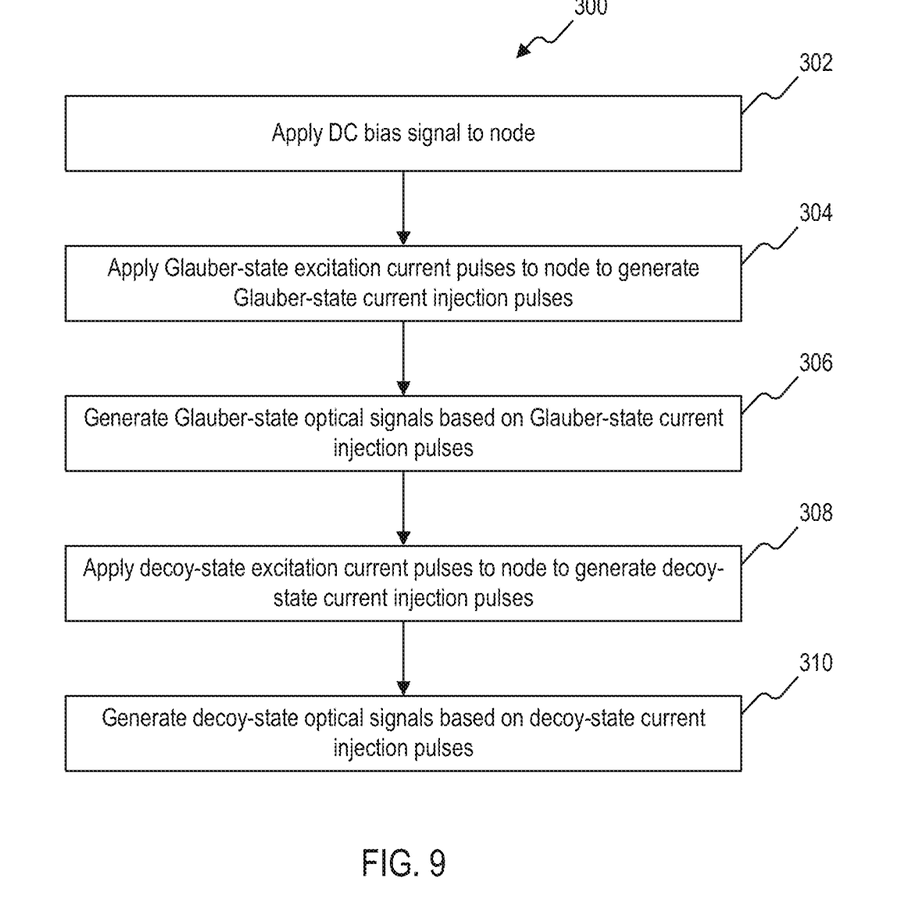
FIG. 9 is a flow diagram of an example of a method for generating indistinguishable Glauber-state and decoy-state optical signals, in accordance with some implementations.

FIG. 9 is a block diagram of an example of a method 300 for generating indistinguishable Glauber-state and decoy-state optical signals. At block 302, the DC current source 102 applies a DC bias signal to the node 110. For example, the electronic controller 108 may send control signals to the DC current source 102 which causes the DC current source 102 to apply a constant DC bias signal to the node 110. At block 304, the configurable pulse generator 104 applies Glauber-state excitation current pulses to the node 110 to generate Glauber-state current injection pulses. For example, the electronic controller 108 may send control signals to the configurable pulse generator 104 which causes the configurable pulse generator 104 to apply Glauber-state excitation current pulses to the node 110. The Glauber-state excitation current pulses combine with the DC bias signal at the node 110 to form the Glauber-state current injection pulses. At block 306, the laser diode 106 generates Glauber-state optical signals based on the Glauber-state current injection pulses. At block 308, the configurable pulse generator 104 applies decoy-state excitation current pulses to the node 110 to generate decoy-state current injection pulses. For example, the electronic controller 108 may send control signals to the configurable pulse generator 104 which causes the configurable pulse generator 104 to apply decoy-state excitation current pulses to the node 110. The decoy-state excitation current pulses combine with the DC bias signal at the node 110 to form the decoy-state current injection pulses. At block 310, the laser diode 106 generates decoy-state optical signals based on the decoy-state current injection pulses.

Figure 10:
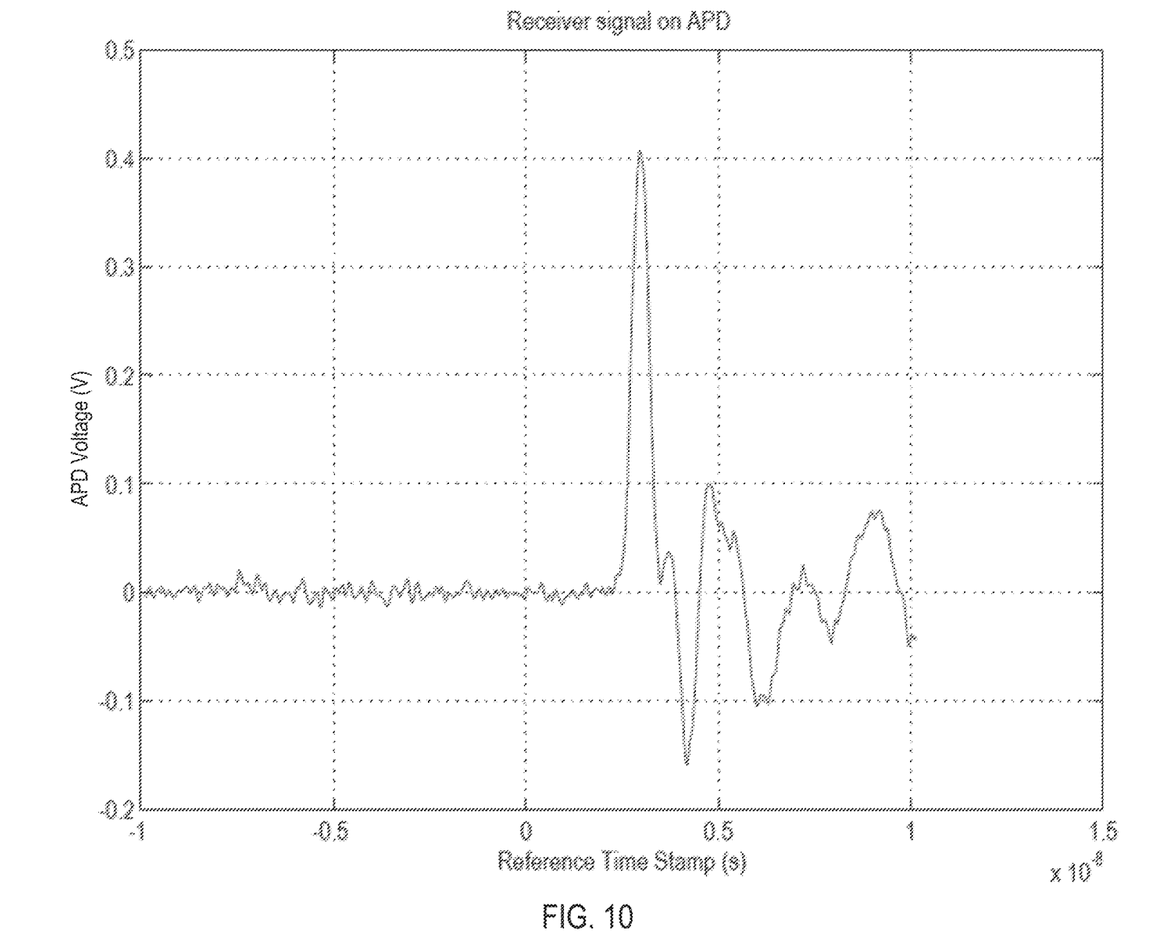
FIG. 10 is a graph of an example of an optical signal generated by system of FIG. 3.

FIG. 10 is a graph of an example of an optical signal generated the laser diode 106. The voltage measurements illustrated in FIG. 10 are from an avalanche photodiode ("APD") in a receiver.

In the foregoing specification, specific implementations have been described. However, one of ordinary skill in the art appreciates that various modifications and changes may be made without departing from the scope of the claims set forth below. Accordingly, the specification and figures are to be regarded in an illustrative rather than a restrictive sense, and all such modifications are intended to be included within the scope of the disclosure.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims and all equivalents thereof.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

Thus, the present disclosure provides, among other things, systems and methods for generating indistinguishable Glauber-state and decoy-state optical signals. Various features and advantages are set forth in the following claims.

What is claimed is:

1. A system for generating indistinguishable Glauber-state and decoy-state optical signals, the system comprising:
    a direct current ("DC") current source coupled to a node;
    a configurable pulse generator coupled to the node;
    an electronic controller coupled to the DC current source and the configurable pulse generator, the electronic controller configured to:
        control the DC current source to apply a DC bias signal to the node,
        control the configurable pulse generator to apply Glauber-state excitation current pulses to the node to generate Glauber-state current injection pulses, and
        control the configurable pulse generator to apply decoy-state excitation current pulses to the node to generate decoy-state current injection pulses, wherein an amplitude of the decoy-state current injection pulses is less than an amplitude of the Glauber-state current injection pulses; and
    a laser diode coupled to the node and configured to:
        generate Glauber-state optical signals based on the Glauber-state current injection pulses, and
        generate decoy-state optical signals based on the decoy-state current injection pulses.

2. The system of claim 1, wherein the electronic controller is further configured to control the DC current source to set a current of the DC bias signal greater than a threshold current of the laser diode.

3. The system of claim 1, wherein the electronic controller is further configured to control the configurable pulse generator to start to apply the decoy-state excitation current pulses to the node earlier than the Glauber-state excitation current pulses.

4. The system of claim 1, further comprising a constant optical attenuator coupled to the laser diode and configured to suppress emissions caused by the DC bias signal.

5. The system of claim 1, wherein the electronic controller is further configured to control the configurable pulse generator to set amplitudes of the decoy-state excitation current pulses lower than amplitudes of the Glauber-state excitation current pulses.

6. The system of claim 1, wherein, to control the DC current source to apply the DC bias signal to the node, the electronic controller is further configured to:
    control the DC current source to apply a Glauber-state DC bias signal to the node to generate the Glauber-state current injection pulses, and
    control the DC current source to apply a decoy-state DC bias signal to the node to generate the decoy-state current injection pulses,
    wherein a current of the decoy-state DC bias signal is lower than a current of the Glauber-state DC bias signal.

7. The system of claim 1, wherein the electronic controller is further configured to:
    determine a difference between the Glauber-state current injection pulses and the decoy-state current injection pulses by measuring current flowing through the laser diode, and
    reduce the difference between the Glauber-state current injection pulses and the decoy-state current injection pulses by adjusting at least one attribute of at least one selected from the group consisting of the DC bias signal, the Glauber-state excitation current pulses, and the decoy-state excitation current pulses.

8. The system of claim 1, wherein the electronic controller is further configured to:
    measure a temperature of the laser diode, and
    adjust, based on the temperature of the laser diode, at least one attribute of at least one selected from the group consisting of the DC bias signal, the Glauber-state excitation current pulses, and the decoy-state excitation current pulses.

9. The system of claim 1, wherein the configurable pulse generator is coupled to the node in an open collector configuration.

10. The system of claim 1, further comprising:
    an alternating current ("AC") block coupled between the DC current source and the node, wherein the AC block is configured to block AC signals from the DC current source, and
    a DC block coupled between the configurable pulse generator and the node, wherein the DC block is configured to block DC signals from the configurable pulse generator.

11. A method for generating indistinguishable Glauber-state and decoy-state optical signals, the method comprising:
    applying, with a direct current ("DC") current source, a DC bias signal to a node;
    applying, with a configurable pulse generator, Glauber-state excitation current pulses to the node to generate Glauber-state current injection pulses;
    generating, with a laser diode coupled to the node, Glauber-state optical signals based on the Glauber-state current injection pulses;
    applying, with the configurable pulse generator, decoy-state excitation current pulses to the node to generate decoy-state current injection pulses, wherein an amplitude of the decoy-state current injection pulses is less than an amplitude of the Glauber-state current injection pulses; and
    generating, with the laser diode, decoy-state optical signals based on the decoy-state current injection pulses.

12. The method of claim 11, further comprising setting a current of the DC bias signal greater than a threshold current of the laser diode.

13. The method of claim 11, further comprising starting to apply the decoy-state excitation current pulses to the node earlier than starting to apply the Glauber-state excitation current pulses to the node.

14. The method of claim 11, further comprising suppressing, with a constant optical attenuator coupled to the laser diode, emissions in the Glauber-state optical signals and the decoy-state optical signals caused by the DC bias signal.

15. The method of claim 11, further comprising setting an amplitude of the decoy-state excitation current pulses lower than an amplitude of the Glauber-state excitation current pulses.

16. The method of claim 11, wherein applying, with the DC current source, the DC bias signal to the node further comprising:
    applying, with the DC current source, a Glauber-state DC bias signal to the node to generate the Glauber-state current injection pulses, and
    applying, with the DC current source, a decoy-state DC bias signal to the node to generate the decoy-state current injection pulses, wherein a current of the decoy-state DC bias signal is lower than a current of the Glauber-state DC bias signal.

17. The method of claim 11, further comprising:

determining a difference between the Glauber-state current injection pulses and the decoy-state current injection pulses by measuring current flowing through the laser diode; and reducing the difference between the Glauber-state current injection pulses and the decoy-state current injection pulses by adjusting at least one attribute of at least one selected from the group consisting of the DC bias signal, the Glauber-state excitation current pulses, and the decoy-state excitation current pulses.

18. The method of claim 11, further comprising:

measuring a temperature of the laser diode; and adjusting, based on the temperature of the laser diode, at least one attribute of at least one selected from the group consisting of the DC bias signal, the Glauber-state excitation current pulses, and the decoy-state excitation current pulses.

19. The method of claim 11, wherein applying, with the configurable pulse generator, the Glauber-state excitation current pulses to the node to generate the Glauber-state current injection pulses further includes the configurable pulse generator drawing current from the node.

20. The method of claim 11, further comprising:

blocking alternating current ("AC") signals from the DC current source with an AC block coupled between the DC current source and the node; and blocking DC signals from the configurable pulse generator with a DC block coupled between the configurable pulse generator and the node.

\* \* \* \* \*